US011367436B2

(12) United States Patent
Hanes et al.

(10) Patent No.: US 11,367,436 B2
(45) Date of Patent: Jun. 21, 2022

(54) COMMUNICATION APPARATUSES

(71) Applicant: HEWLETT-PACKARD DEVELOPMENT COMPANY, L.P., Houston, TX (US)

(72) Inventors: David H. Hanes, Fort Collins, CO (US); John Michael Main, Fort Collins, CO (US); Jon R. Dory, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 776 days.

(21) Appl. No.: 16/074,280

(22) PCT Filed: Sep. 27, 2016

(86) PCT No.: PCT/US2016/053949
§ 371 (c)(1),
(2) Date: Jul. 31, 2018

(87) PCT Pub. No.: WO2018/063155
PCT Pub. Date: Apr. 5, 2018

(65) Prior Publication Data
US 2021/0193132 A1 Jun. 24, 2021

(51) Int. Cl.
*G10L 15/22* (2006.01)
*G06F 16/33* (2019.01)
(Continued)

(52) U.S. Cl.
CPC .............. *G10L 15/22* (2013.01); *G06F 3/165* (2013.01); *G06F 3/167* (2013.01);
(Continued)

(58) Field of Classification Search
None
See application file for complete search history.

(56) References Cited

U.S. PATENT DOCUMENTS 8,340,975 B1 * 12/2012 Rosenberger ........... G10L 15/22
704/275
8,995,972 B1   3/2015 Cronin
(Continued)

FOREIGN PATENT DOCUMENTS

CN       101282186     10/2008
EP         2881898      6/2015
(Continued)

OTHER PUBLICATIONS

"Digital Assistants like Siri, Google Assistant to go mainstream by 2019: Gartner", Retrieved from Internet: https://www.gadgetsnow.com/tech-news/Digital-Assistants-like-Siri-Google-Assistant-to-go-mainstream-by-2019-Gartner/articleshow/52855896.cms, Jun. 21, 2016, 1 Page.
(Continued)

*Primary Examiner* — Quynh H Nguyen
(74) *Attorney, Agent, or Firm* — Dicke Billig & Czaja PLLC (57) ABSTRACT

In one example of the disclosure, a communication apparatus includes a first microphone. The communication apparatus is to be wirelessly and contemporaneously connected to a set of microphones including the first microphone. The communication apparatus is to receive microphone data from each microphone of the set of microphones, wherein the microphone data is indicative of a user spoken phrase captured by the set of microphones. The communication apparatus is to establish based on the received microphone data a selected microphone from among the set of microphones.

14 Claims, 6 Drawing Sheets

(51) Int. Cl.
*G06F 3/16* (2006.01)
*H04R 1/08* (2006.01)

(52) U.S. Cl.
CPC .... *G06F 16/3343* (2019.01); *G10L 2015/221* (2013.01); *G10L 2015/223* (2013.01); *H04R 1/08* (2013.01)

(56) References Cited

U.S. PATENT DOCUMENTS

| | | | |
|---|---|---|---|
| 9,094,768 | B2 | 7/2015 | Labosco |
| 2007/0238490 | A1 | 10/2007 | Myrberg et al. |
| 2010/0114944 | A1 | 5/2010 | Adler et al. |
| 2014/0330560 | A1 | 11/2014 | Venkatesha et al. |
| 2014/0365222 | A1 | 12/2014 | Weider et al. |
| 2015/0023481 | A1 | 1/2015 | Wu et al. |
| 2015/0293904 | A1 | 10/2015 | Roberts |
| 2016/0005281 | A1 | 1/2016 | Laska et al. |
| 2016/0260431 | A1* | 9/2016 | Newendorp ............ G10L 15/32 |

FOREIGN PATENT DOCUMENTS

| | | |
|---|---|---|
| GB | 2515527 | 12/2014 |
| JP | 2002182679 | 6/2002 |
| WO | 2016039992 A1 | 3/2016 |

OTHER PUBLICATIONS

Gebhart, "How to Bring Alexa Into Every Room of Your Home", Retrieved from Internet: https://www.cnet.com/how-to/how-to-install-alexa-in-every-room-of-your-home/, Apr. 6, 2016, 10 Pages.

"Smart Home Applications Enabled by New XMOS Voice Capture Technology", Retrieved from Internet: http://www.audioxpress.com/news/Smart-Home-Applications-Enabled-by-New-XMOS-Voice-Capture-Technology, Mar. 22, 2016, 7 Pages.

Writer, "UE Speakers Add Support for Two Digital Assistants—Google Now and Siri", Retrieved from Internet: http://www.technewstoday.com/30211-ue-speakers-add-support-for-two-digital-assistants-google-now-and-siri/, 2016, 6 Pages.

\* cited by examiner

COMMUNICATION APPARATUSES

BACKGROUND

In today's world, users are increasingly utilizing technology-based devices, including smartphones, tablets, and personal computers, to access voice-accessible virtual assistant functions. Popular virtual assistant functions include enabling users to create actionable tasks according to voice instruction and performing such tasks by accessing search engines, email, SMS, electronic calendars, electronic contacts directories, and other applications.

DETAILED DESCRIPTION

In the current state of the industry, a user may employ a communication device, with its own microphone and speaker, to interact with a virtual assistant service. As users employ such communication devices more and more, they may desire to access multiple virtual assistant services as some services will be better for some tasks or functions than others. For instance, a user may desire to have one virtual assistant manage a calendar, another virtual assistant service to obtain news and sports scores, and yet another virtual assistant service to control lights in the home.

Having multiple communication devices with embedded (or otherwise dedicated) microphones to communicate with one or more virtual assistant services can present operational difficulties. Depending upon the location of a user relative to the communication devices, background noise, and other factors, a user spoken phrase might not be detected by the communication device that would send the request to the desired virtual assistant service. In another example, employing multiple communication devices with dedicated microphones to communicate with multiple virtual assistant services can be unsatisfactory due to the user being provided with too many responses to detections of the user spoken phrase by microphones.

To address these issues, various examples described in more detail below provide a communication apparatus and a method that enables effective and efficient communication with virtual assistant services utilizing a set of microphones. In one example, a communication apparatus is wirelessly and contemporaneously connected to a set of microphones, the set including a first microphone that is part of the communication apparatus. In certain examples, the wireless and contemporaneous connection is a Wi-Fi™ connection. The communication apparatus is to receive microphone data from each microphone of the set of microphones, wherein the microphone data is indicative of a user spoken phrase captured by the set of microphones. The communication apparatus establishes a selected microphone from among the set of microphones based on the received microphone data. The selected microphone sends microphone data associated with the user spoken phrase, as captured at the selected microphone, to a computing device via the wireless connection. The computing device is to, in turn, send the at least a portion of the microphone data to a server system hosting a virtual assistant service. In certain examples, the server system may send a response phrase to the computing device, which in turn may send the response phrase to a communication apparatus for audio output at a speaker included within the communication apparatus.

In this manner, then, the disclosed examples of a communication apparatus and communication method will enable establishment of a set of Wi-Fi™ enabled microphones that can be spread throughout a user's home. The Wi-Fi™ connection among the set of microphones enables establishment of a selected microphone based on the received microphone data to send a captured user utterance to multiple virtual assistant services at the same time. Users will enjoy the efficiency and ease of use made possible by the disclosed communication apparatus and method, and utilization of voice-activated virtual assistant services should be enhanced.

Figure 1:
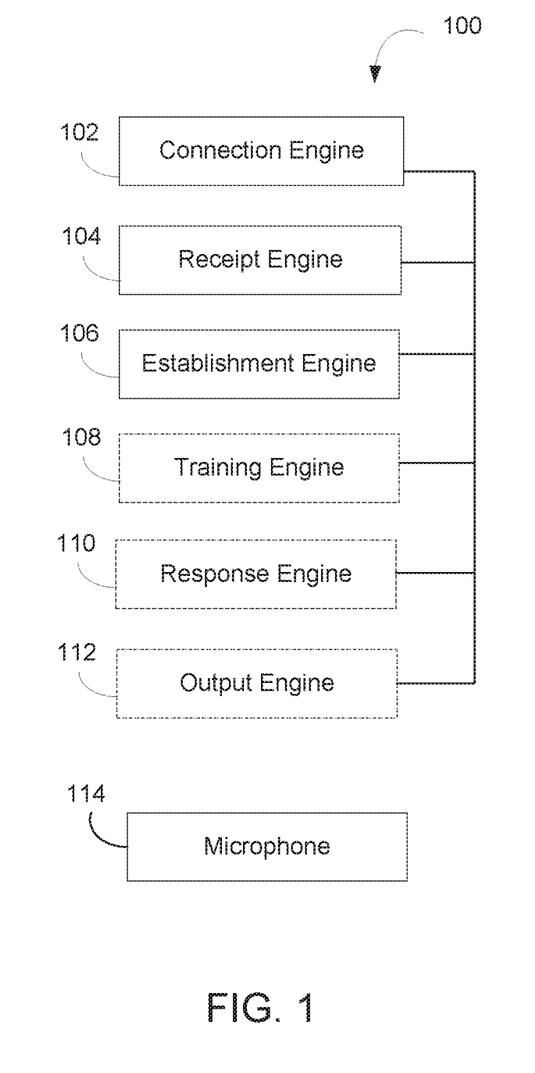
FIG. 1 is a block diagram depicting an example of a communication apparatus.
Figure 2:
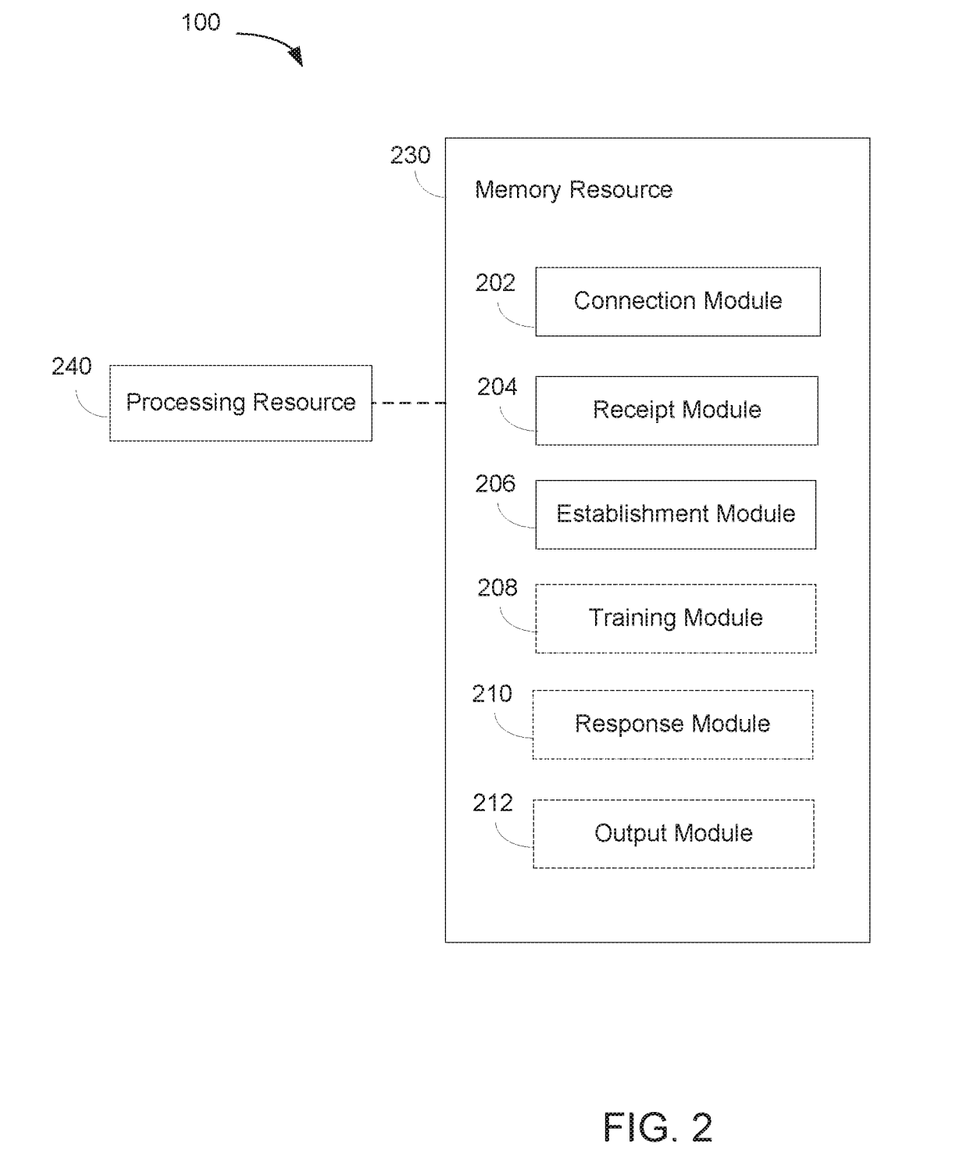
FIG. 2 is a block diagram depicting a memory resource and a processing resource to implement examples of a communication apparatus.

FIGS. 1 and 2 depict examples of physical and logical components for implementing various examples. In FIG. 1 various components are identified as engines 102, 104, 106, 108, 110, and 112. In describing engines 102-112 focus is on each engine's designated function. However, the term engine, as used herein, refers generally to a combination of hardware and/or programming to perform a designated function. As is illustrated later with respect to FIG. 2, the hardware of each engine, for example, may include one or both of a processor and a memory, while the programming may be code stored on that memory and executable by the processor to perform the designated function.

FIG. 1 is a block diagram depicting components of a communication apparatus 100. In this example, computing device 100 includes a connection engine 102, receipt engine 104, establishment engine 106, training engine 108, response engine 110, output engine 112, and a microphone 114 (sometimes referred to herein as "subject microphone 114"). In performing their respective functions, engines 102-112 may access a data repository, e.g., a memory accessible to computing device 100 that can be used to store and retrieve data.

In an example, connection engine 102 represents generally a combination of hardware and programming to wirelessly and contemporaneously connect the communication apparatus 100 to a set of microphones, the set including subject microphone 114. In an example, the wireless and contemporaneous connection of the communication apparatus 100 to the set of microphones may be via a radio-based computer network. As used herein, a "contemporaneous connection" of the communication apparatus to the set of microphones refers generally to the ability of the communication apparatus to send microphone data to the microphones of the set concurrently, e.g., via a token ring, Ethernet, or other network configuration, as opposed to the communication apparatus relying upon one to one connections with the microphones of the set. In a particular example, the wireless and contemporaneous connection of the communication apparatus 100 to the set of microphones may be via a Wi-Fi™ network connection.

In an example, receipt engine 104 represents generally a combination of hardware and programming to receive microphone data from each microphone of the set of microphones. As used herein, a "microphone" refers generally to any device converting sound waves into electrical energy variations, which may then be recorded or otherwise captured, amplified, or transmitted. As used herein "data" refers generally to representations in the form of digital electrical signals (including, but not limited to representations of quantities, characters, and symbols) upon which operations may performed by a computer (e.g., including, but not limited to read, write, and transmit operations). As used herein, "microphone data" refers generally to data that is indicative of a user spoken phrase detected at a microphone of a communication apparatus. As used herein, a "phrase" refers generally to a set of words (i.e. one or more words) that function as a unit or constituent to convey a thought or concept. As used herein a "word" refers generally to a meaningful element of speech or writing, typically to communicate a thought or concept. In some examples, microphone data may include a trigger phrase. As used herein, a "trigger phrase" refers generally to a phrase that, when detected as having been spoken, is to cause a device (e.g., a communication apparatus, a computing device, or a system) or an application or service hosted by a device, to perform an action or initiate an event. In particular examples, a trigger phrase may be a phrase that is unique to a virtual assistant service hosted by a server system. As used herein, a "virtual assistant service" or "virtual assistant" refers generally to an application or other computer program that performs tasks or services for a user based on a user spoken phrase via a smartphone, notebook computer, desktop computer, or other computing device that is in electronic connection with the server system hosting the service. In examples, the tasks or services may be performed based on user input, location awareness, and the ability to access information from a variety of online sources (such as weather or traffic conditions, news, stock prices, user schedules, retail prices, etc.).

In a particular example, subject microphone 114 may be a component of communication apparatus that also includes a speaker. As used herein, a "speaker" refers generally to any device that is to convert a received electrical audio signal into a corresponding sound. In examples, some or all of the microphones of the set of microphones may be part of communication apparatuses that also include speakers. In examples, some of the microphones of the set of microphones may be standalone microphones with Wi-Fi™ or other contemporaneous connection wireless capability.

Establishment engine 106 represents generally a combination of hardware and programming to establish a selected microphone from among the set of microphones based on the received microphone data. The selected microphone is to send microphone data associated with the user spoken phrase as captured at the selected microphone to a computing device via the wireless connection. The computing device that receives the microphone data from communication apparatus 100 is to in turn send the at least a portion of the microphone data to a server system hosting a virtual assistant service.

In certain examples, establishment engine 106 may also send to the computing device a message that is to establish the selected microphone as a default microphone for the computing device. In this manner the computing device will know to receive microphone data from the selected microphone, versus other microphones of the set of microphones, for subsequent user captured phrases.

In certain examples, establishment engine 106 may determine that the microphone data received from each microphone of the set of microphones is indicative of a same user spoken phrase. In this manner the communication apparatus 100 may be aware that the microphones of the set are detecting a same user utterance. In such instances, establishment engine 106 may establish the selected microphone from the set of microphones based on the received microphone data by determining the selected microphone has a strongest signal level.

In particular examples, establishment engine 106, in establishing the selected microphone from among the set of microphones based on the received microphone data, may utilize an acoustic echo cancellation process to identify and eliminate background sounds. As used herein, an acoustic echo cancellation process refers generally to a process to improve voice or sound quality by preventing echo from being created, or by removing echo after it is already present. In certain examples, echo cancellation may involve recognizing an originally transmitted signal that re-appears, with some delay, in a transmitted or received signal. Once the echo is recognized, it may be removed by subtracting it from the transmitted or received signal. In certain examples, this process may be implemented digitally using a digital signal processor or programming.

In other examples, establishment engine 106 may in establishing the selected microphone based on the received microphone data determine a proximity of a user to the microphones to the selected microphone relative to the other microphones of the set. In certain examples, establishment engine 106 may determine the proximity of the user to the microphones based upon one or more sensors that detects presence of a user. In an example, a sensor may be included within one or more of the microphones of the set. In another example, a sensor may be located remotely from the microphones of the set, with the sensor being in electronic communication with the communication apparatus.

In a particular example, communication apparatus 100 may include a training engine 108. Training engine 108 represents generally a combination of hardware and programming to identify distances between microphones of the set of microphones based upon the ability of the microphones to detect a predetermined sound. In examples, the predetermined sound may be a tone emitted at a predetermined frequency and/or predetermined volume for purposes of the testing routine. Utilizing the results of this training routine, establishment engine 106 may consider the identified distances between microphones in establishing which of the set of microphones is to be the selected microphone.

In another example, establishment engine 106 may, in establishing the selected microphone from among the set of microphones, determine a proximity to a user based upon a determination of proximity to a mobile computing device associated with the user. As used herein, the terms "mobile computing device" and "mobile device" are used synonymously, and refer generally to any portable computing device, including, but not limited to, a notebook computer, tablet computer, or smartphone. For instance, if establishment engine 106 obtains an IP address or other identifier for a smartphone, tablet, gaming device, or other mobile computing device that is owned by or otherwise associated with a target user, establishment engine 106 may utilize the determined distance of the mobile device from the respective microphones of the set as a proxy for the distance of the user associated with such mobile device to the various microphones. In an example, establishment engine 106 may determine the association of a mobile device and/or an identifier for a mobile device with a user by accessing a lookup table.

In certain examples where communication apparatus 100 includes a speaker, communication apparatus 100 may also include a response engine 110 and an output engine 112. Response engine 110 represents generally a combination of hardware and programming to receive, from a computing device to which the microphone data was sent and via the contemporaneous connection wireless network, a response phrase. In examples, the response phrase may be a phrase or message that was determined at a server system that received the microphone data from a computing device, and that was thereafter sent by the server system to the same computing device. Output engine 112 represents generally a combination of hardware and programming to cause output, via the speaker at communication apparatus 100, of the response phrase that was received by response engine 110.

In a particular example in which communication apparatus 100 includes a response engine 110 and output engine 112, a user may send an instruction to the communication apparatus 100 to accept response phrases from a first computing device via the contemporaneous wireless network, and not accept response phrases from a second computing device via the contemporaneous wireless network, when the first and second computing devices are conduits to a same virtual assistant service. In this manner, the likelihood of the communication apparatus receiving and/or outputting duplicate response phrases is reduced.

For instance after establishment engine 106 has established a selected microphone from the set based on the received microphone data, the selected microphone may send the microphone data associated with the user spoken phrase, as captured at the selected microphone, to a first computing device and to a second computing device via the contemporaneous wireless connection, In this example, the first and second computing devices in turn send the at least a portion of the microphone data to the server system hosting the virtual assistant service. The first and second computing devices receive response phrases from the server system hosting the virtual assistant service, and send the response phrases to communication apparatus 100. Response engine 110 receives the response phrases sent by each of the first and second computing devices. However, in this example as apparatus 100 had received a user instruction to avoid output of multiple response phrases from a same virtual assistant service, output engine 112 causes an output via the speaker of the response phrases received from the first computing device and not the response phrases received from the second computing device. In another example, the communication apparatus 100, e.g., based on a received user selection or instruction not to send microphone data to a specific server or to a specific virtual assistant service, may not send the microphone data to a user-specified server that hosts a virtual assistant service.

In another particular example in which communication apparatus 100 includes a response engine 110 and output engine 112, the selected microphone may send the microphone data associated with the user spoken phrase as captured at the selected microphone to a first computing device and multiple other computing devices via the wireless connection. In this example it is assumed that the microphone data is indicative of a spoken trigger phrase that, when received by a particular virtual assistant service, is to cause that virtual assistant service to send a response phrase. For example, if the trigger phrase is "Hey Cortana", the sending of the microphone data including the trigger phrase to the first computing device, which in turn sends the microphone date data with the trigger phrase to a first server system hosting the Cortana virtual assistant service, will cause the first server system service to send a response phrase, e.g., "How may I help?" In this example it is further assumed that the "Hey Cortana" trigger phrase, when received by the other computing devices and communicated to the other server systems, is not effective to invoke a response from the other (non-Cortana) virtual assistant services that receive the microphone data. For instance, if a second virtual assistant service that is an "ABC virtual assistant service" expects a trigger phrase "Hello ABC", receipt of the "Hello Cortana" trigger phrase does not cause the second server system associated with the ABC virtual assistant service to send a response. Thus, in this example response engine 110 receives the response phrase from the first computing device as a result of the first virtual assistant service recognizing the "Hey Cortana" trigger phrase included in the microphone data. In this example, response engine 110 does not receive a response phrase from the second computing device or any other of the set of computing devices other than the first computing device, as the other computing devices are communicating with server systems hosting virtual assistant services that do not recognize or do not respond to the "Hey Cortana" trigger phrase.

In yet another particular example in which communication apparatus 100 includes a response engine 110 and output engine 112, the selected microphone may send at least a portion of the microphone data associated with the user spoken phrase as captured at the selected microphone to a computing device via the wireless connection, wherein the computing device in turn sends the at least a portion of the microphone data to a set of server systems wherein each server system of the set hosts a distinct virtual assistant service. In this example, response engine 110 receives a response phrase that was determined by a first virtual assistant service hosted by a first server system of the set, wherein the first virtual assistant service recognized the at least a portion of the microphone data as a trigger phrase unique to the first virtual assistant service. For instance if first virtual assistant service is a Cortana virtual assistant service that recognizes in the microphone data the phrase "Hey Cortana" (a trigger phrase unique to the Cortana virtual assistant service), that first (Cortana) virtual assistant service may determine a response (e.g., "How can I assist you today?") that the first server system sends to the computer system, and that response engine 110 received from the computer system. The other server systems of the set that are connected to the computer system would not send response phrases for forwarding to the response engine 110, as the other (non-Cortana) virtual assistant services affiliated with the other server systems would not accept "Hey Cortana" as an acceptable trigger phrase.

As used herein, a "link" refers generally to an infrastructure or combination of infrastructures to enable an electronic connection, wireless connection, other connection, or combination thereof, to enable data communication between components and/or computing devices. Such infrastructure or infrastructures may include, but are not limited to, a cable, wireless, fiber optic, or remote connection via a telecommunication link, an infrared link, or a radio frequency link. For example, a "link" may refer to or represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" between components, e.g., between two computing devices, refers generally to a connection via an electrical conductor that may enable a transfer of data between components. A "wireless connection" between components, e.g., between two computing devices, refers generally to a connection between the components that is not via an electrical conductor and may enable a transfer of data between components. A wireless connection may be via a wireless communication protocol or wireless standard for exchanging data.

In the foregoing discussion of FIG. 1, engines 102-112 were described as combinations of hardware and programming. Engines 102-112 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement computing device 100 of FIG. 1.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement computing device 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

In FIG. 2, the executable program instructions stored in memory resource 230 are depicted as connection module 202, receipt module 204, establishment module 206, training module 208, response module 210, and output module 212. Connection module 202 represents program instructions that when executed by processing resource 240 may perform any of the functionalities described above in relation to connection engine 102 of FIG. 1. Receipt module 204 represents program instructions that when executed by processing resource 240 may perform any of the functionalities described above in relation to receipt engine 104 of FIG. 1. Establishment module 206 represents program instructions that when executed by processing resource 240 may perform any of the functionalities described above in relation to establishment engine 106 of FIG. 1. Training module 208 represents program instructions that when executed by processing resource 240 may perform any of the functionalities described above in relation to training engine 108 of FIG. 1. Response module 210 represents program instructions that when executed by processing resource 240 may perform any of the functionalities described above in relation to response engine 110 of FIG. 1. Output module 212 represents program instructions that when executed by processing resource 240 may perform any of the functionalities described above in relation to output engine 112 of FIG. 1.

Figure 3:
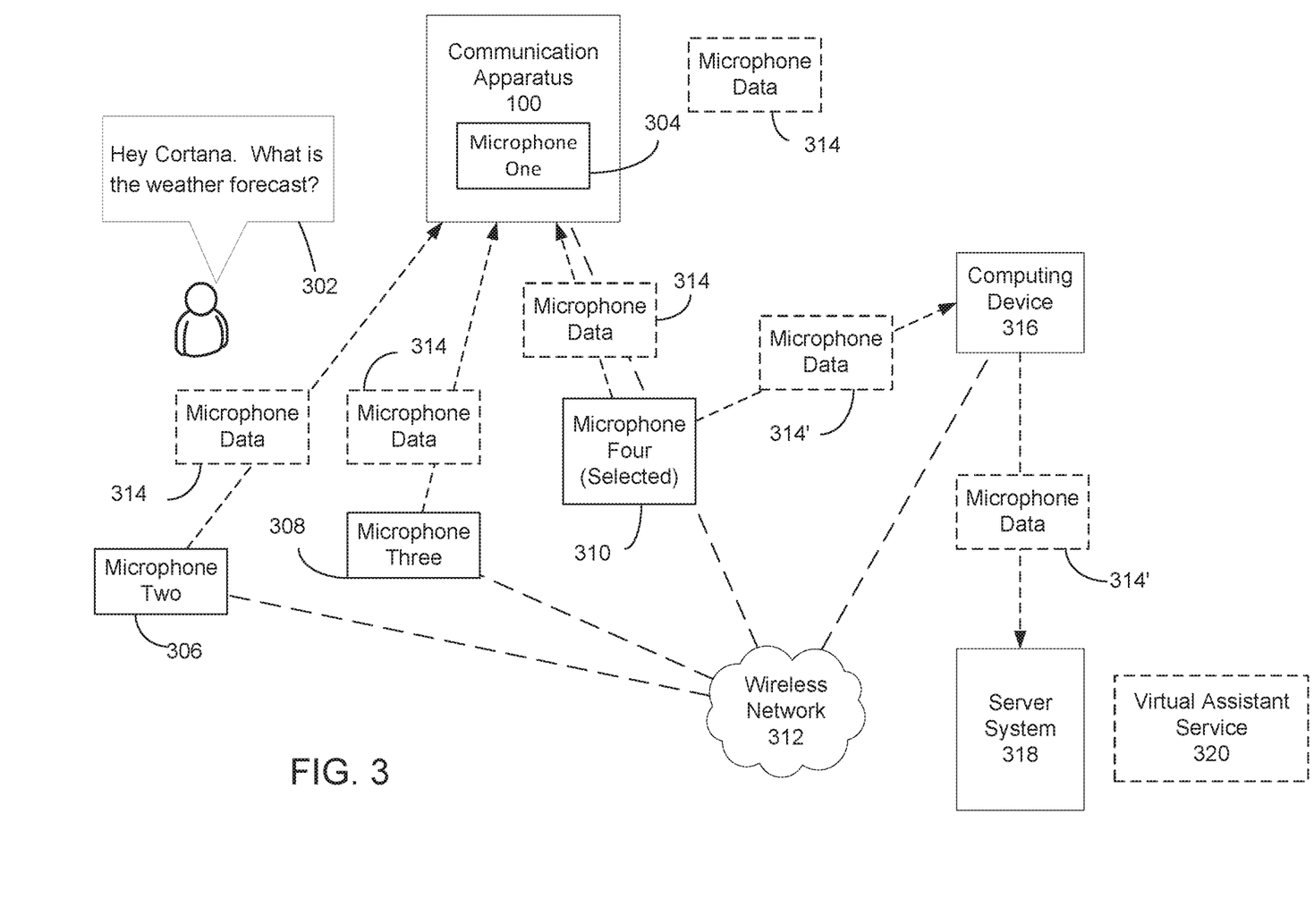
FIG. 3 illustrates an example of a communication apparatus that is wirelessly connected to a set of microphones and is to establish a selected microphone from among the set based on the received microphone data.

FIG. 3, in view of FIGS. 1, and 2, illustrates an example of a communication apparatus that is wirelessly connected to a set of microphones and is to establish a selected microphone from among the set. In this example a user speaks a phrase "Hey Cortana. What is the weather forecast?" 302 in an environment in which each of a set of microphones (microphone one 304, microphone two 306, microphone three 308, and microphone four 310) can detect the utterance. Each of microphone one 304, microphone two 306, microphone three 308, and microphone four 310 is contemporaneously connected to the communication apparatus 100 via wireless network 312, with microphone one 304 being a part of communication apparatus 100. In examples, wireless network 312 may be a Wi-Fi™ network.

Communication apparatus 100 receives microphone data 314 from each microphone of the set of microphones (microphone one 304, microphone two 306, microphone three 308, and microphone four 310), wherein the microphone data 314 is indicative of the user spoken phrase captured by each of the set of microphones.

Communication apparatus 100 establishes microphone four 310 as a selected microphone from among the set of microphones based on the received microphone data. In turn, selected microphone four 310 sends, via the wireless network 312, microphone data 314' as captured at the selected microphone four 310 to a computing device 316. Computing device 316 is to in turn send the at least a portion of the microphone data 314' to a server system 318 hosting a virtual assistant service 320.

In examples, virtual assistant service 320 hosted at server system 318 may determine, based upon the received at least a portion of the microphone data 314', a response phrase appropriate for user spoken phrase 302. Server system 318 may in turn send the response phrase to computing device 316. Computing device 316 may in turn send, and communication apparatus 100 may receive, the response phrase via wireless network 312. In an example, communication apparatus 100 may then cause output of the received response phrase via a speaker.

In examples, communication apparatus 100 may be a standalone communication apparatus, or may be included within a household object or other common object or media such as a decorative planter or a furniture piece. In other examples, communication apparatus 100 may be included within another computing device, such as a smartwatch or other wearable computing device. In a particular example, communication apparatus 100 could be, but is not required to be, included within computing device 316.

Figure 4:
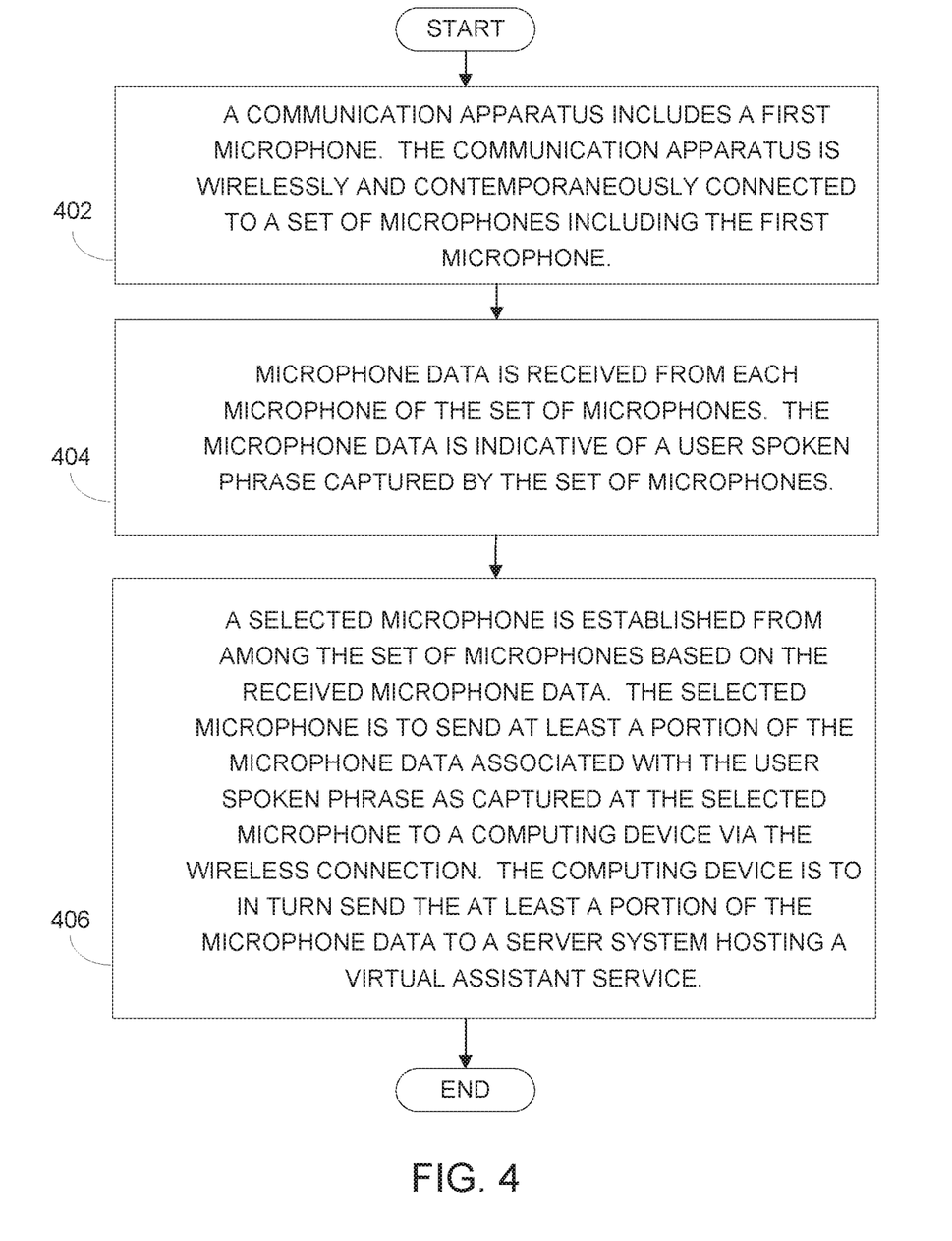
FIG. 4 is a flow diagram depicting implementation of an example of a communication method.

FIG. 4 is a flow diagram of implementation of a method for identification of preferred communication apparatuses. In discussing FIG. 4, reference may be made to the components depicted in FIGS. 1 and 2. Such reference is made to provide contextual examples and not to limit the manner in which the method depicted by FIG. 4 may be implemented. A communication apparatus includes a first microphone. The communication apparatus is wirelessly and contemporaneously connected to a set of microphones including the first microphone (block 402). Referring back to FIGS. 1 and 2, connection engine 102 (FIG. 1) or connection module 202 (FIG. 2), when executed by processing resource 240, may be responsible for implementing block 402.

Microphone data is received from each microphone of the set of microphones. The microphone data is indicative of a user spoken phrase captured by the set of microphones (block 404). Referring back to FIGS. 1 and 2, receipt engine 104 (FIG. 1) or receipt module 204 (FIG. 2), when executed by processing resource 240, may be responsible for implementing block 404.

A selected microphone is established from among the set of microphones based on the received microphone data. The selected microphone is to send at least a portion of the microphone data associated with the user spoken phrase as captured at the selected microphone to a computing device via the wireless connection. The computing device is to in turn send the at least a portion of the microphone data to a server system hosting a virtual assistant service (block 406). Referring back to FIGS. 1 and 2, establishment engine 106 (FIG. 1) or establishment module 206 (FIG. 2), when executed by processing resource 240, may be responsible for implementing block 406.

Figure 5:
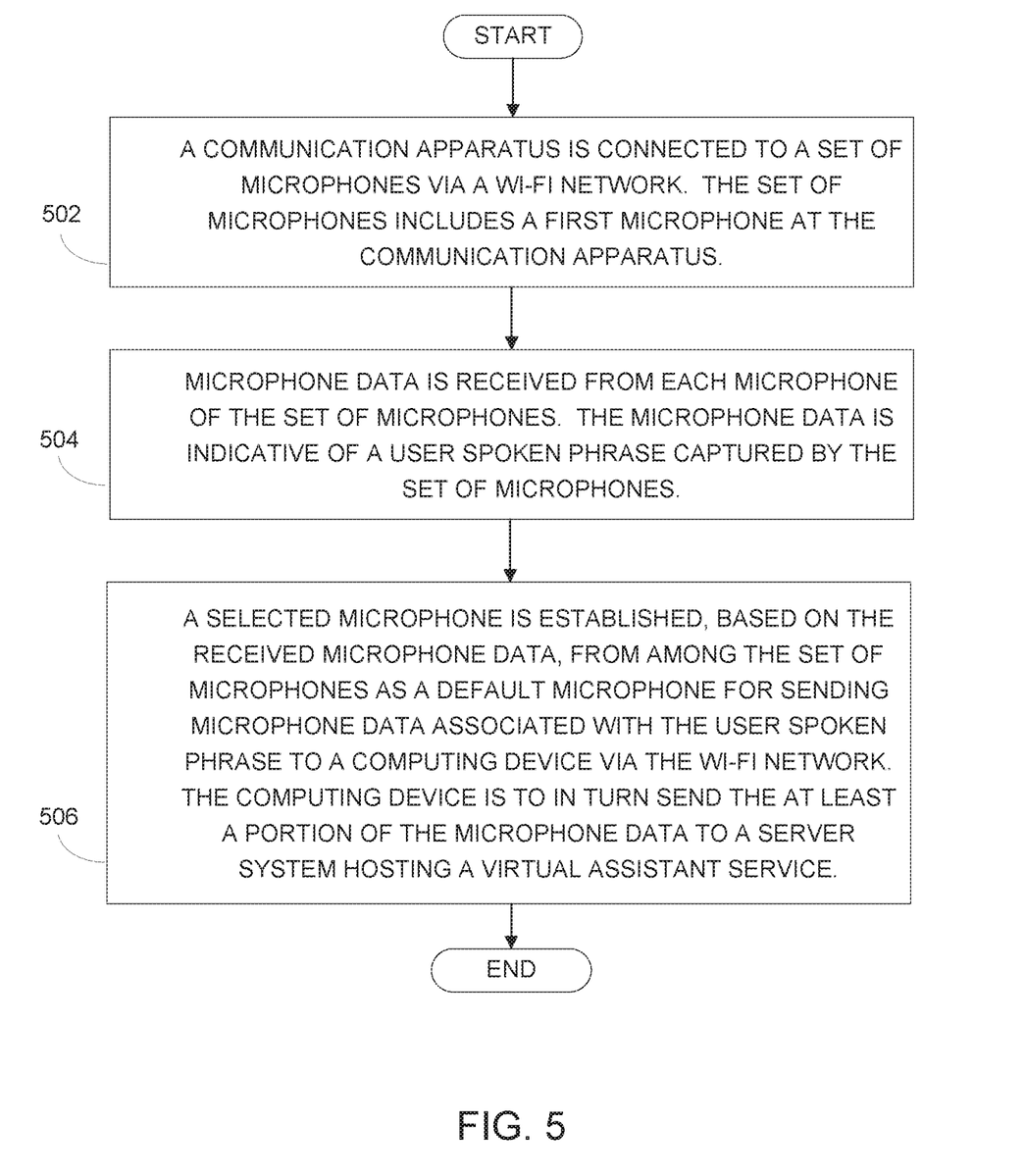
FIG. 5 is a flow diagram depicting implementation of an example of a communication method wherein a communication apparatus is connected to a set of microphones via a Wi-Fi™ network.

FIG. 5 is a flow diagram of implementation of a method for identification of preferred communication apparatuses. In discussing FIG. 5, reference may be made to the components depicted in FIGS. 1 and 2. Such reference is made to provide contextual examples and not to limit the manner in which the method depicted by FIG. 5 may be implemented. A communication apparatus is connected to a set of microphones via a Wi-Fi network. The set of microphones includes a first microphone at the communication apparatus (block 502). Referring back to FIGS. 1 and 2, connection engine 102 (FIG. 1) or connection module 202 (FIG. 2), when executed by processing resource 240, may be responsible for implementing block 502.

Microphone data is received from each microphone of the set of microphones. The microphone data is indicative of a user spoken phrase captured by the set of microphones (block 504). Referring back to FIGS. 1 and 2, receipt engine 104 (FIG. 1) or receipt module 204 (FIG. 2), when executed by processing resource 240, may be responsible for implementing block 504.

A selected microphone is established, based on the received microphone data, from among the set of microphones as a default microphone for sending microphone data associated with the user spoken phrase to a computing device via the Wi-Fi network. The computing device is to in turn send the at least a portion of the microphone data to a server system hosting a virtual assistant service (block 506). Referring back to FIGS. 1 and 2, establishment engine 106 (FIG. 1) or establishment module 206 (FIG. 2), when executed by processing resource 240, may be responsible for implementing block 506.

Figure 6:
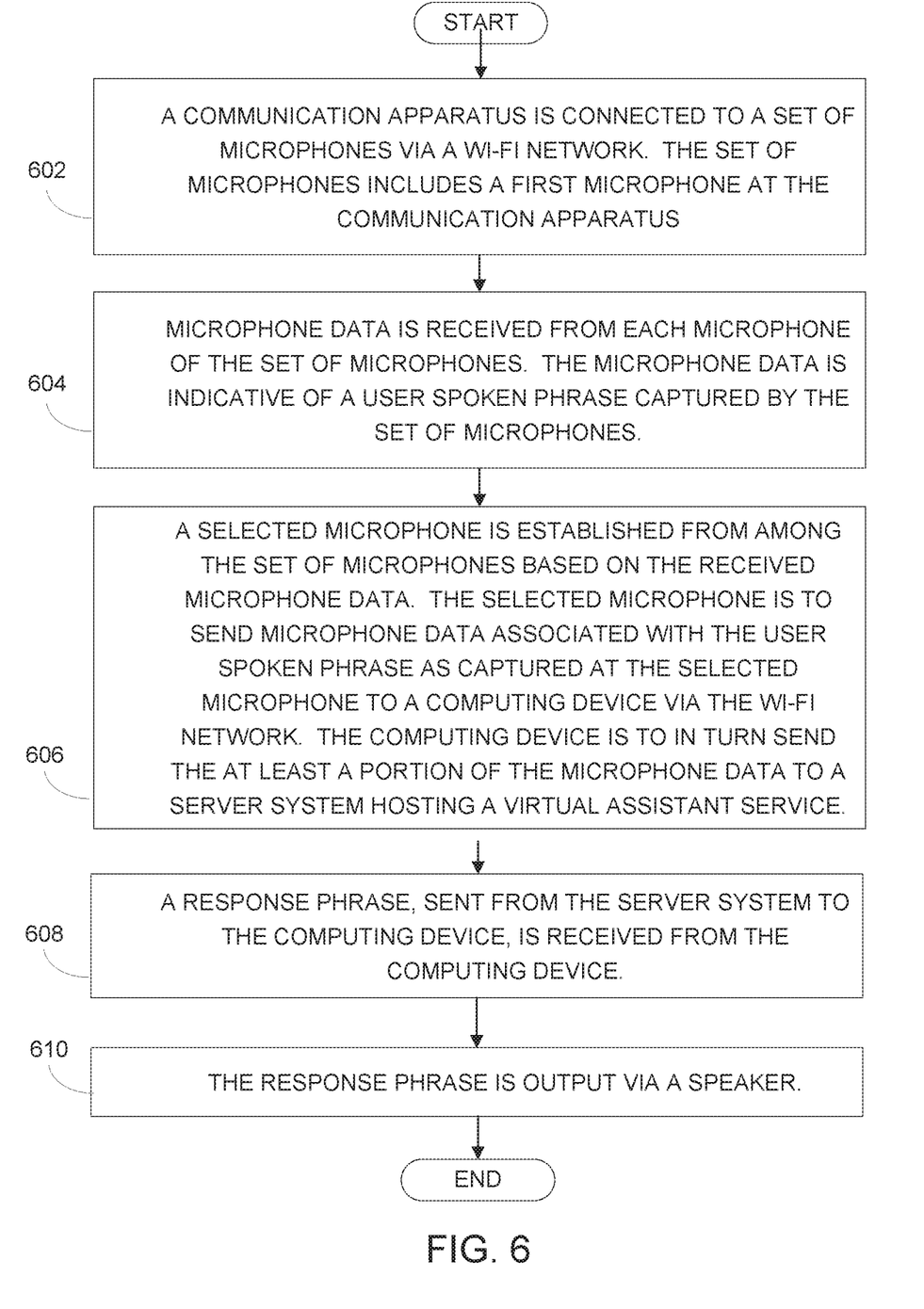
FIG. 6 is a flow diagram depicting implementation of an example of a communication method, wherein a communication apparatus is to receive a response phrase from a computing device and is to output the response phrase via a speaker.

FIG. 6 is a flow diagram of implementation of a method for identification of preferred communication apparatuses. In discussing FIG. 6, reference may be made to the components depicted in FIGS. 1 and 2. Such reference is made to provide contextual examples and not to limit the manner in which the method depicted by FIG. 6 may be implemented. A communication apparatus is connected to a set of microphones via a Wi-Fi network. The set of microphones includes a first microphone at the communication apparatus (block 602). Referring back to FIGS. 1 and 2, connection engine 102 (FIG. 1) or connection module 202 (FIG. 2), when executed by processing resource 240, may be responsible for implementing block 602.

Microphone data is received from each microphone of the set of microphones. The microphone data is indicative of a user spoken phrase captured by the set of microphones (block 604). Referring back to FIGS. 1 and 2, receipt engine 104 (FIG. 1) or receipt module 204 (FIG. 2), when executed by processing resource 240, may be responsible for implementing block 604.

A selected microphone is established from among the set of microphones based on the received microphone data. The selected microphone is to send microphone data associated with the user spoken phrase as captured at the selected microphone to a computing device via the Wi-Fi network. The computing device is to in turn send the at least a portion of the microphone data to a server system hosting a virtual assistant service (block 606). Referring back to FIGS. 1 and 2, establishment engine 106 (FIG. 1) or establishment module 206 (FIG. 2), when executed by processing resource 240, may be responsible for implementing block 606.

A response phrase, sent from the server system to the computing device, is received from the computing device (block 608). Referring back to FIGS. 1 and 2, response engine 110 (FIG. 1) or response module 210 (FIG. 2), when executed by processing resource 240, may be responsible for implementing block 608.

The response phrase is output via a speaker (block 610). Referring back to FIGS. 1 and 2, output engine 112 (FIG. 1) or output module 212 (FIG. 2), when executed by processing resource 240, may be responsible for implementing block 610.

FIGS. 1-6 aid in depicting the architecture, functionality, and operation of various examples. In particular, FIGS. 1 and 2 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electro-magnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 4-6 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A communication apparatus comprising:
   a first microphone;
   a connection engine to wirelessly and contemporaneously connect the communication apparatus to a set of microphones including the first microphone;
   a receipt engine, to receive microphone data from each microphone of the set of microphones, wherein the microphone data is indicative of a user spoken phrase captured by the set of microphones;
   an establishment engine, to establish a selected microphone from among the set of microphones based on the received microphone data, wherein the selected microphone is to send at least a portion of the microphone data associated with the user spoken phrase as captured at the selected microphone to a computing device via the wireless connection, the computing device to in turn send the at least a portion of the microphone data to a set of server systems, wherein each server system of the set of server systems hosts a distinct virtual assistant service of a set of virtual assistant services, wherein each virtual assistant service recognizes a distinct trigger phrase of a plurality of user-selectable trigger phrases, wherein the microphone data includes a trigger phrase of the plurality of user-selectable trigger phrases;
   a speaker;
   a response engine, to receive from the computing device a response phrase sent from the server system to the computing device and to avoid a duplicate response phrase; and
   an output engine to cause output, via the speaker, of the response phrase.

2. The communication apparatus of claim 1, wherein the establishment engine is to send a message to the computing device to establish the selected microphone as a default microphone for the computing device to receive microphone data from.

3. The communication apparatus of claim 1, wherein the establishment engine is to determine that the microphone data received from each of the set of microphones is indicative of a same user spoken phrase.

4. The communication apparatus of claim 1, wherein the establishment engine is to establish the selected microphone from among the set of microphones by determining the selected microphone has the strongest signal level.

5. The communication apparatus of claim 1, wherein the establishment engine, in establishing the selected microphone from among the set of microphones, utilizes an acoustic echo cancellation process to identify and eliminate background sounds.

6. The communication apparatus of claim 1, wherein the establishment engine, in establishing the selected microphone from among the set of microphones, determines a proximity of a user to a microphone from the set of microphones based upon a sensor that detects user presence.

7. The communication apparatus of claim 1, wherein the establishment engine, in establishing the selected microphone from among the set of microphones, determines a proximity to a user based upon a determination of proximity to a mobile computing device associated with the user.

8. The communication apparatus of claim 1, further comprising a training engine to identify distances between microphones of the set of microphones based upon the ability of the microphones to detect a predetermined sound.

9. The communication apparatus of claim 1, wherein computing device is connected to the communication apparatus via the wireless network, and wherein the response engine is to receive the response phrase from the computing device.

10. The communication apparatus of claim 1,
    wherein the computing device is a first computing device and the response phrase is a first response phrase, and
    wherein the selected microphone is to send the microphone data associated with the user spoken phrase as captured at the selected microphone to a second computing device via the wireless connection, and
    wherein the second computing device to in turn sends the at least a portion of the microphone data to the server system hosting the virtual assistant service, and
    wherein the response engine is to receive the second response phrase from the second computing device, and
    wherein the output engine to cause output, via the speaker, of the first response phrase and is not to cause output of the second response phrase according to a user instruction.

11. The communication apparatus of claim 1,
    wherein the computing device is a first computing device and the virtual assistant service is a first virtual assistant service, and
    wherein the selected microphone is to send the microphone data associated with the user spoken phrase as captured at the selected microphone to a second computing device via the wireless connection, and
    wherein the second computing device in turn sends the at least a portion of the microphone data to a second server system hosting a second virtual assistant service, and
    wherein the response engine receives the response phrase from the first computing device as a result of the first virtual assistant service recognizing the at least a portion of the microphone data, and the response engine does not receive from the second computing device a response phrase as the second virtual assistant service does not recognize the at least a portion of the microphone data.

12. The communication apparatus of claim 1, wherein the computing device is to send the at least a portion of the microphone data to a set of server systems, wherein the response phrase was determined by a first virtual assistant service hosted by a first server system of the set, and wherein the first virtual assistant service recognized the at least a portion of the microphone data as a trigger phrase unique to the first virtual assistant service.

13. A communication method, comprising:
- connecting a communication apparatus to a set of microphones via a Wi-Fi network, wherein the set of microphones includes a first microphone at the communication apparatus;
- receiving microphone data from each microphone of the set of microphones, wherein the microphone data is indicative of a user spoken phrase captured by the set of microphones; and
- establishing a selected microphone, based on the received microphone data, from among the set of microphones as a default microphone for sending microphone data associated with the user spoken phrase to a computing device via the Wi-Fi network, the computing device to in turn send the at least a portion of the microphone data to a server systems, wherein each server system of the set of server systems host a distinct virtual assistant service of a set of virtual assistant services, wherein each virtual assistant service recognizes a distinct trigger phrase of a plurality of user-selectable trigger phrases, wherein the microphone data includes a trigger phrase of the plurality of user-selectable trigger phrases;
- receiving from the computing device a response phrase sent from the server system to the computing device and avoiding a duplicate response phrase; and
- outputting, via a speaker, the response phrase.

14. A memory resource storing instructions that when executed cause a processing resource at a communication apparatus to effect a communication, the instructions comprising:

- a connection module that when executed causes the processing resource to connect the communication apparatus to a set of microphones, the set including a first microphone at the communication apparatus, via a Wi-Fi network;
- a receipt module that when executed causes the processing resource to receive microphone data from each microphone of the set of microphones, wherein the microphone data is indicative of a user spoken phrase captured by the set of microphones;
- an establishment module that when executed causes the processing resource to establish a selected microphone from among the set of microphones based on the received microphone data, wherein the selected microphone is to send microphone data associated with the user spoken phrase as captured at the selected microphone to a computing device via the Wi-Fi network, the computing device to in turn send the at least a portion of the microphone data to a set of server systems, wherein each server system of the set of server systems host a distinct virtual assistant service of a set of virtual assistant services, wherein each virtual assistant service recognizes a distinct trigger phrase of a plurality of user-selectable trigger phrases, wherein the microphone data includes a trigger phrase of the plurality of user-selectable trigger phrases;
- a response module that when executed causes the processing resource to receive from the computing device a response phrase sent from the server system to the computing device and avoid a duplicate response phrase from the virtual assistant device; and
- an output module that when executed causes the processing resource to output the response phrase via a speaker.

* * * * *